US011277974B2

(12) United States Patent
Cai

(10) Patent No.: US 11,277,974 B2
(45) Date of Patent: Mar. 22, 2022

(54) LIGHT FIXTURE FOR INDOOR GROW APPLICATION INCLUDING HOUSING THAT DEFINES A PASSAGEWAY

(71) Applicant: HCGI, Inc., Las Vegas, NV (US)

(72) Inventor: Dengke Cai, Camas, WA (US)

(73) Assignee: HGCI, Inc., Las Vegas, NV (US)

(*) Notice: Subject to any disclaimer, the term of this patent is extended or adjusted under 35 U.S.C. 154(b) by 0 days.

(21) Appl. No.: 17/314,049

(22) Filed: May 7, 2021

(65) Prior Publication Data

US 2021/0282332 A1    Sep. 16, 2021

Related U.S. Application Data

(63) Continuation of application No. 16/820,090, filed on Mar. 16, 2020, now Pat. No. 11,032,976.

(51) Int. Cl.
*A01G 7/04* (2006.01)
*F21V 5/00* (2018.01)
(Continued)

(52) U.S. Cl.
CPC .............. *A01G 7/045* (2013.01); *F21V 3/10* (2018.02); *F21V 5/007* (2013.01); *F21V 29/763* (2015.01);
(Continued)

(58) Field of Classification Search
CPC ..... A01G 7/045; F21V 29/507; F21V 29/763; F21V 3/10; F21V 5/007; F21V 31/04; F21V 23/008
See application file for complete search history.

(56) References Cited

U.S. PATENT DOCUMENTS 7,828,465 B2 * 11/2010 Roberge .................... F21S 8/04
362/294
8,529,099 B2 * 9/2013 Yang ....................... F21V 29/77
362/294
(Continued)

FOREIGN PATENT DOCUMENTS

EP         2058584 A1    5/2009
EP         2457016 A1    5/2012
WO      2011011734 A1    1/2011

OTHER PUBLICATIONS

Dagnelies, Joelle; Supplementary European Search Report issued in European Patent Application No. 20891427.5; dated Oct. 26, 2021; 4 pages.

*Primary Examiner* — Leah Simone Macchiarolo
(74) *Attorney, Agent, or Firm* — Ulmer & Berne LLP

(57) ABSTRACT

A light fixture includes a housing, a controller, and a lighting module. The housing includes a first portion and a second portion. The second portion of the housing defines a window. The controller is at least partially disposed within the first portion. The lighting module is at least partially disposed in the second portion and includes a submount and a plurality of light emitting diodes coupled with the submount. The plurality of light emitting diodes are configured to project light through the window. The housing defines a passageway that extends between the first portion and the second portion such that the lighting module and the controller are physically spaced from each other via the passageway. The passageway is configured to allow ambient air to flow through the housing between the first support portion and the second support portion to facilitate cooling of the lighting module and the controller.

21 Claims, 6 Drawing Sheets

(51) Int. Cl.
*F21V 29/76* (2015.01)
*F21V 3/10* (2018.01)
*F21V 31/04* (2006.01)
*F21Y 105/12* (2016.01)
*F21Y 115/10* (2016.01)

(52) U.S. Cl.
CPC .......... *F21V 31/04* (2013.01); *F21Y 2105/12* (2016.08); *F21Y 2115/10* (2016.08)

(56) References Cited

U.S. PATENT DOCUMENTS

| | | | | |
|---|---|---|---|---|
| 10,317,608 B2* | 6/2019 | Lim | ..................... | G02B 6/0036 |
| 10,571,112 B2* | 2/2020 | Engberg | ................... | F21S 8/086 |
| 2010/0020492 A1* | 1/2010 | Luo | ......................... | F21V 15/01 |
| | | | | 361/693 |
| 2010/0038657 A1* | 2/2010 | Higuchi | .................... | F21S 8/02 |
| | | | | 257/88 |
| 2010/0172143 A1* | 7/2010 | Cunius | .................... | F21V 29/83 |
| | | | | 362/373 |
| 2011/0002124 A1* | 1/2011 | Chang | ..................... | F21V 29/89 |
| | | | | 362/294 |
| 2011/0026251 A1* | 2/2011 | Liu | ....................... | F21V 23/008 |
| | | | | 362/249.02 |
| 2011/0032714 A1* | 2/2011 | Chang | ................... | F21V 29/507 |
| | | | | 362/373 |
| 2013/0293156 A1 | 11/2013 | Wells | | |
| 2014/0347848 A1* | 11/2014 | Pisavadia | ................... | F21K 9/20 |
| | | | | 362/190 |
| 2015/0345770 A1* | 12/2015 | Badley | ................... | F21V 23/009 |
| | | | | 362/373 |
| 2016/0178178 A1* | 6/2016 | Brumm | ................. | F21V 29/508 |
| | | | | 362/373 |
| 2017/0023193 A1* | 1/2017 | Thosteson | ............ | H05B 47/185 |

* cited by examiner

LIGHT FIXTURE FOR INDOOR GROW APPLICATION INCLUDING HOUSING THAT DEFINES A PASSAGEWAY

REFERENCE TO RELATED APPLICATIONS

This application is a continuation of U.S. patent application Ser. No. 16/820,090, entitled Light Fixture for Indoor Grow Application and Components Thereof, filed Mar. 16, 2020 and hereby incorporates this patent application by reference herein in its entirety.

TECHNICAL FIELD

The apparatus described below generally relates to a light fixture that includes an array of light sources for illuminating an indoor grow facility. Each light source includes a light emitting diode (LED), a lens, an encapsulating material that substantially fills the lens, and a protective coating provided over an exterior surface of the lens.

BACKGROUND

Indoor grow facilities, such as greenhouses, include light fixtures that provide artificial lighting to plants for encouraging growth. Each of these light fixtures typically includes a plurality of LEDs that generate the artificial light for the plants. The environment inside these indoor grow facilities, however, can include different types of gasses and/or airborne fluid particles that cause the optical quality of the LEDs to degrade (e.g., yellow) over time.

BRIEF DESCRIPTION OF THE DRAWINGS

Various embodiments will become better understood with regard to the following description, appended claims and accompanying drawings wherein:

DETAILED DESCRIPTION

Figure 1:
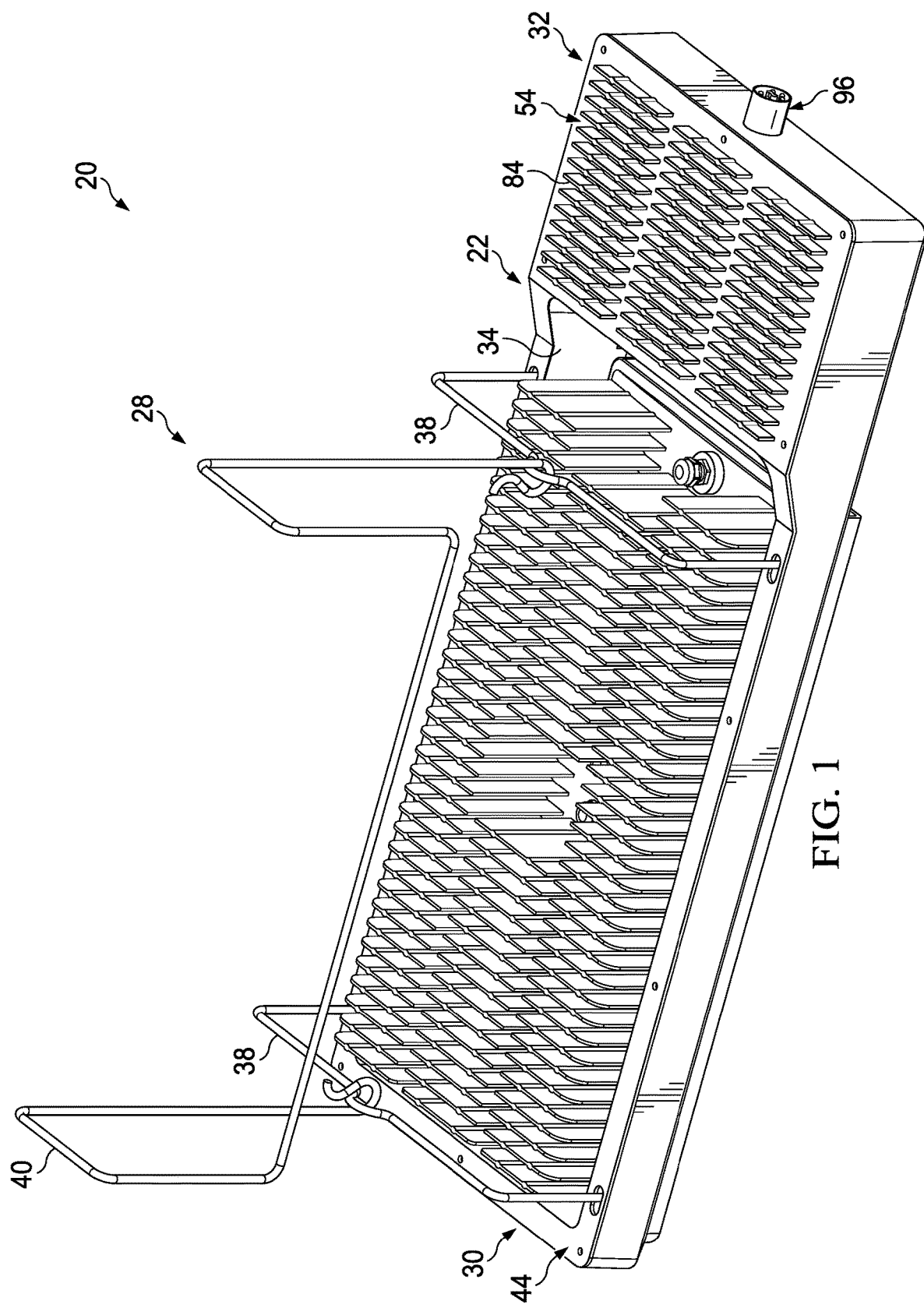
FIG. 1 is an upper isometric view depicting a light fixture, in accordance with one embodiment.
Figure 2:
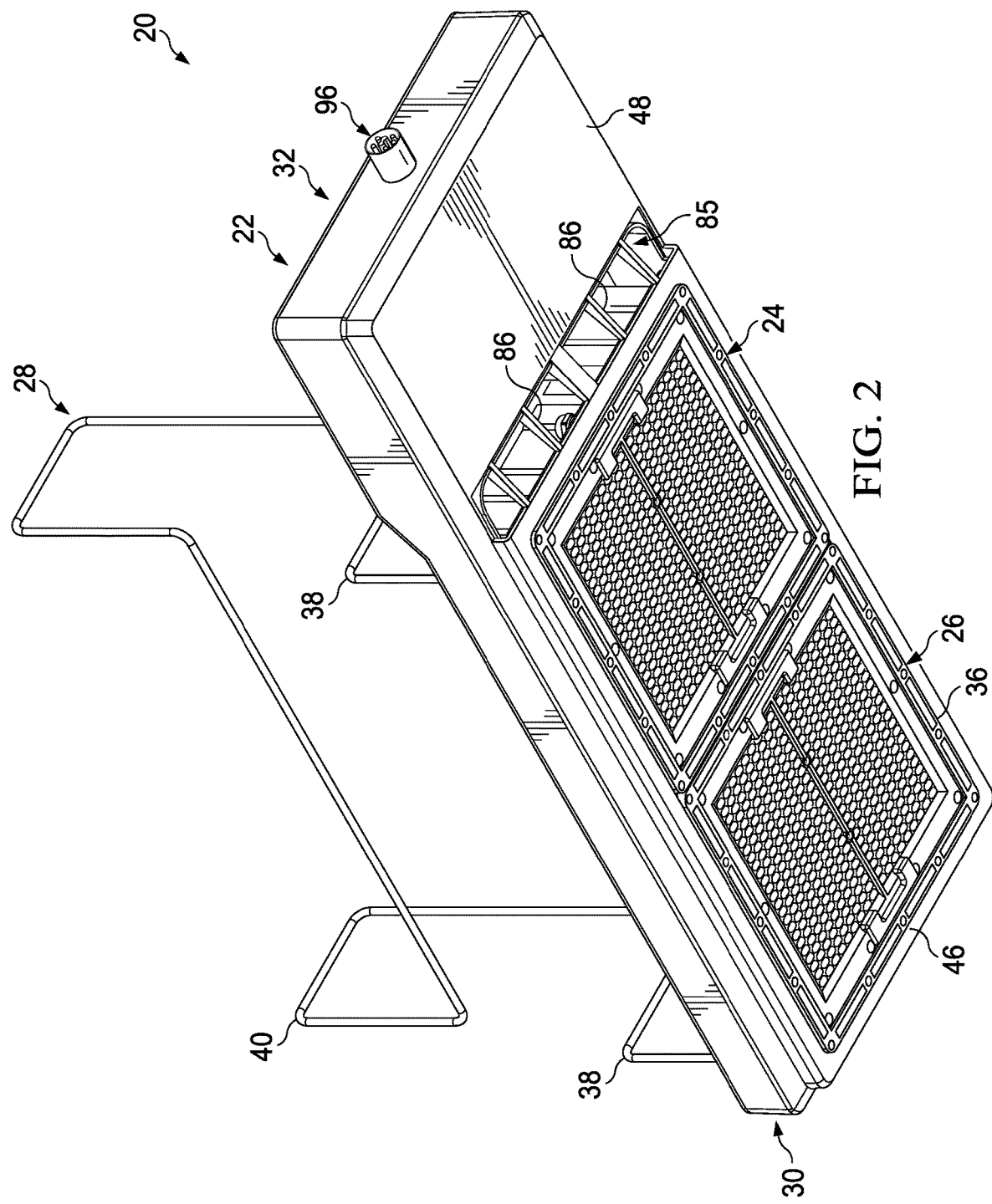
FIG. 2 is a lower isometric view of the light fixture of FIG. 1.

Embodiments are hereinafter described in detail in connection with the views and examples of FIGS. 1-6, wherein like numbers indicate the same or corresponding elements throughout the views. A light fixture 20 for an indoor grow facility (e.g., a greenhouse) is generally depicted in FIGS. 1 and 2 and can include a housing 22, first and second lighting modules 24, 26 (FIG. 2), and a hanger assembly 28. The housing 22 can include a light support portion 30 and a controller support portion 32 adjacent to the light support portion 30. The light support portion 30 can define a lighting receptacle 34 (FIG. 1) and a window 36 (FIG. 2) disposed beneath the lighting receptacle 34. The first and second lighting modules 24, 26 (FIG. 2) can be disposed within the lighting receptacle 34 above the window 36 and can be configured to emit light through the window 36, as will be described in further detail below.

The hanger assembly 28 can facilitate suspension of the light fixture 20 above one or more plants (not shown) such that light emitted through the window 36 from the first and second lighting modules 24, 26 can be delivered to the underlying plant(s) to stimulate growth. The hanger assembly 28 can include a pair of hanger supports 38 and a hanger bracket 40. The hanger supports 38 can be coupled to the housing 22 on opposing sides of the light fixture 20. The hanger bracket 40 can be coupled with the hanger supports 38 and can extend between the hanger supports 38 to facilitate suspension of the light fixture 20 from a ceiling of the indoor grow facility. In one embodiment, as illustrated in FIGS. 1 and 2, the hanger bracket 40 can have a cross-sectional shape that is substantially J-shaped to facilitate selective hanging of the light fixture 20 from a beam or other elongated support member that is provided along a ceiling of the indoor grow facility.

Figure 3:
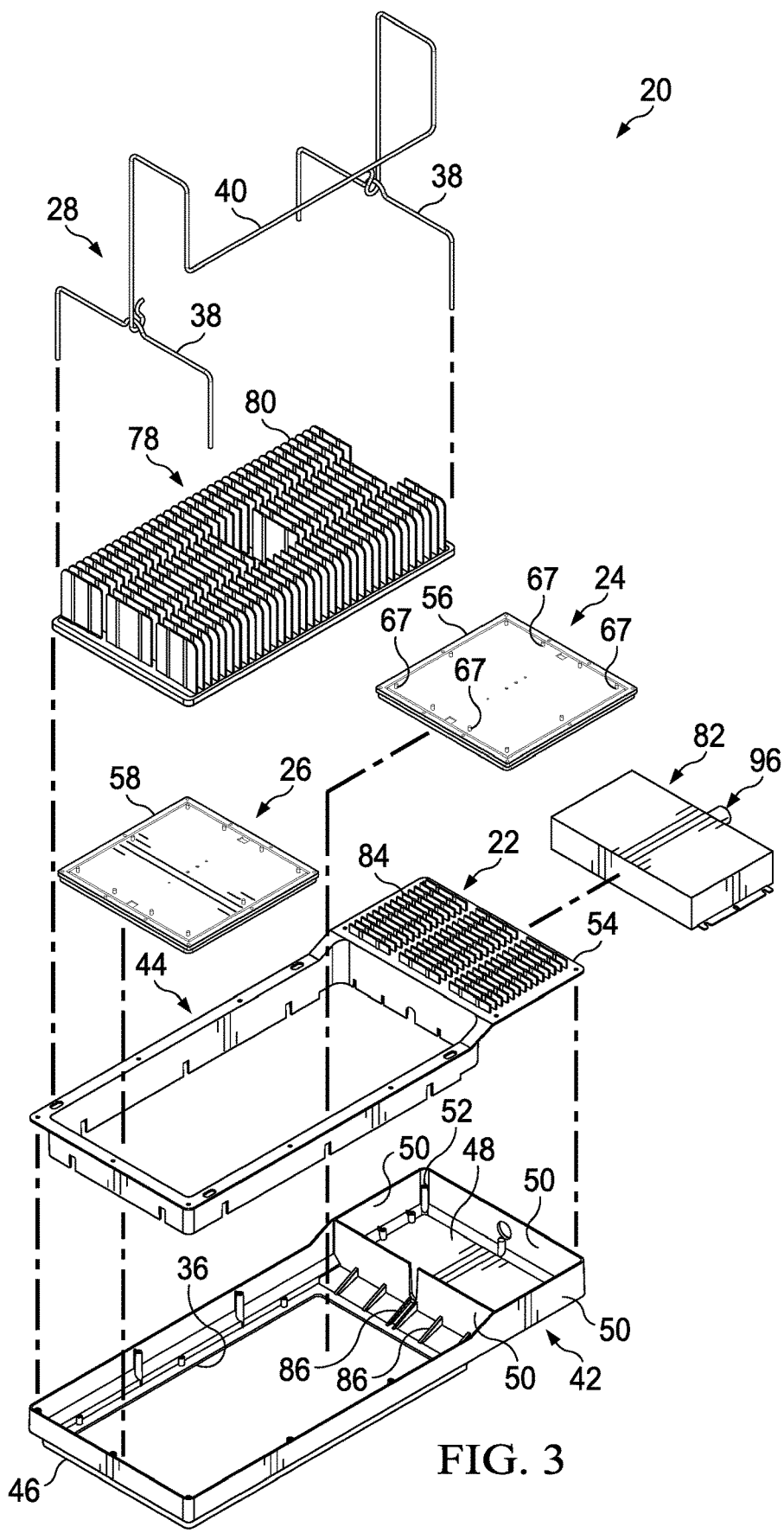
FIG. 3 is a partially exploded upper isometric view of the LED light fixture of FIG. 1.
Figure 4:
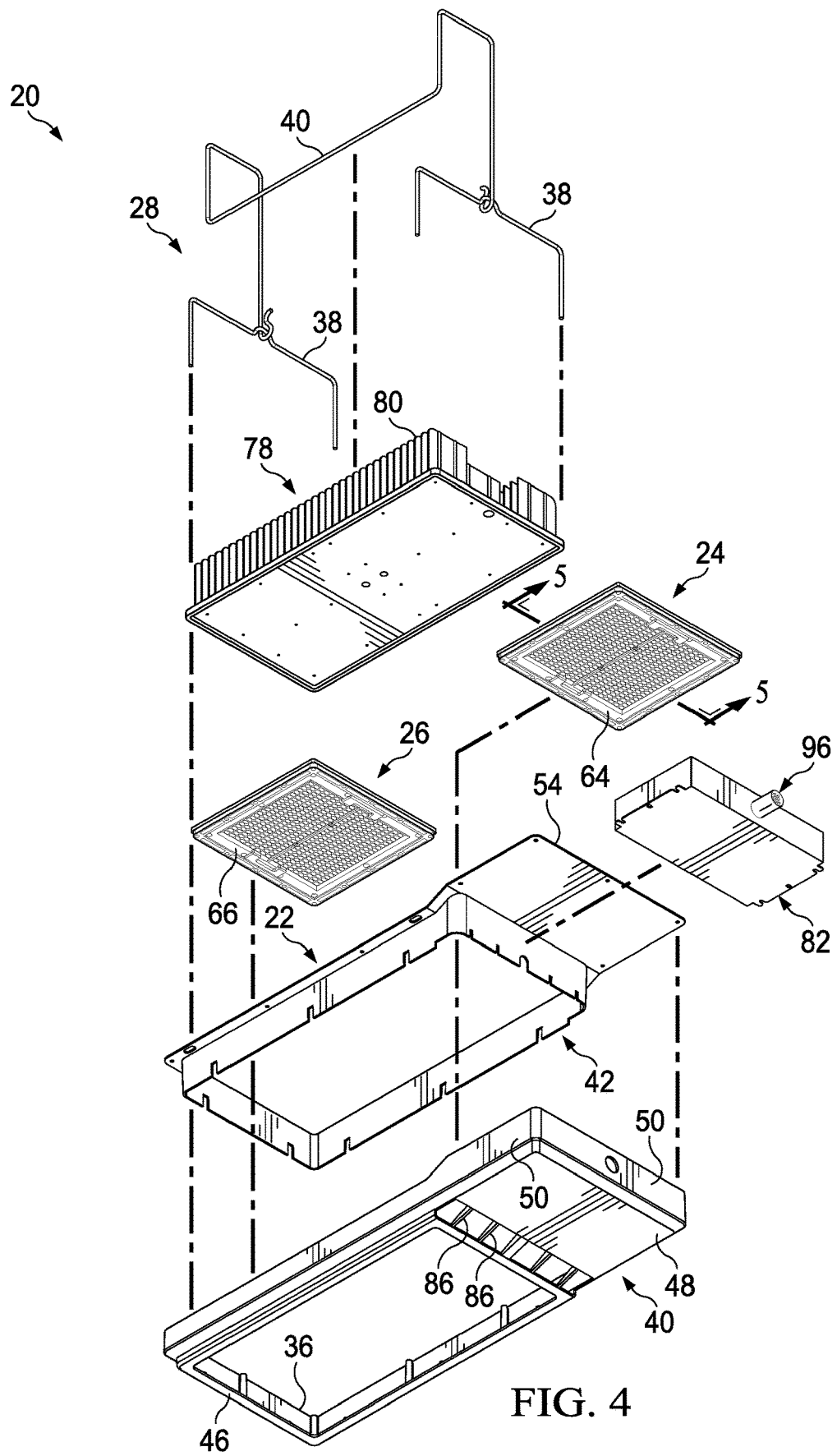
FIG. 4 is a partially exploded lower isometric view of the LED light fixture of FIG. 1.

Referring now to FIGS. 3 and 4, the housing 22 can include a main frame 42 and a cover member 44 that overlies the main frame 42 and is coupled together with the main frame 42 via welding, adhesives, releasable tabs (not shown), fasteners (not shown), or any of a variety of suitable alternative permanent or releasable fastening arrangements. The main frame 42 can include a bottom lighting wall 46 that defines the window 36. As illustrated in FIG. 3, the main frame 42 can include a bottom controller wall 48, and a plurality of sidewalls 50 that cooperate to define a controller receptacle 52. The cover member 44 can include a lid portion 54 that overlies and covers the controller receptacle 52, as illustrated in FIG. 1. The bottom controller wall 48, the sidewalls 50, and the lid portion 54 can form at least part of the controller support portion 32 of the housing 22.

Figure 5:
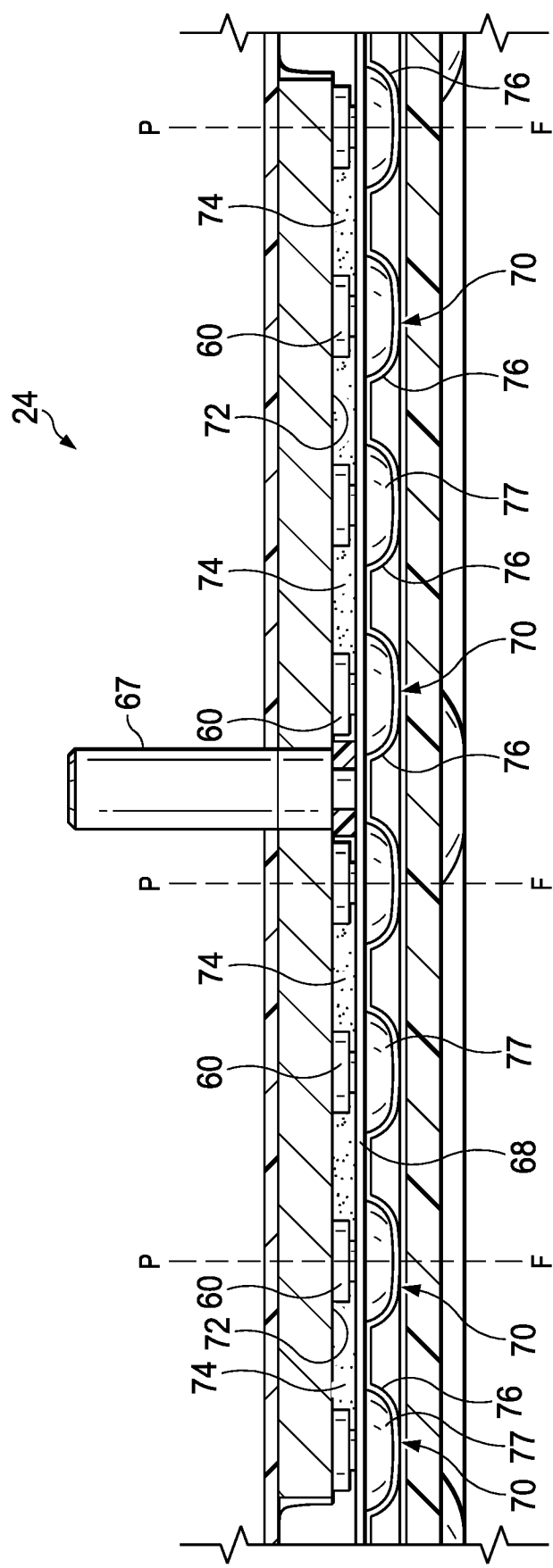
FIG. 5 is a cross-sectional view taken along the line 5-5 in FIG. 4.

As illustrated in FIG. 4, the first and second lighting modules 24, 26 can each include a submount 56, 58, a plurality of light emitting diodes (LEDs) (e.g., 60 in FIG. 5), and a lens cover 64, 66. Referring to FIG. 5, the first lighting module 24 will now be discussed, but can be understood to be representative of the second lighting module 26. The LEDs 60 can comprise surface mount LEDs that are mounted to the submount 56 via any of a variety of methods or techniques commonly known in the art. The LEDs 60 can be any of a variety of suitable configurations that are mounted directly or indirectly to the submount 56. The LEDs 60 can comprise single color LEDs (e.g., capable of emitting only one color of light such as white, red or blue), multi-color LEDs (e.g., capable of emitting different colors such as white, red, and blue) or a combination of both. The submount 56 can be formed of any of a variety of thermally conductive materials that are suitable for physically and thermally supporting the LEDs 60.

The lens cover 64 can overlie the submount 56 and the LEDs 60 and can be coupled with the submount 56 with fasteners 67 or any of a variety of suitable alternative coupling arrangements. The lens cover 64 can include a base substrate 68 that is substantially planar and a plurality of optical lens elements 70 that protrude from the base substrate 68. Each of the optical lens elements 70 can be substantially aligned with respective ones of the LEDs 60 and can be configured to redistribute (e.g., concentrate or disperse) the light emitted from the LEDs 60 towards an area beneath the light fixture 20 (e.g., towards one or more plants). In one embodiment, as illustrated in FIGS. 4 and 5, each of the optical lens elements 70 can have an indented oval shape. However, the optical lens elements 70 can be any of a variety of suitable alternative shapes or combinations thereof for achieving a desired redistribution of light emitted from the LEDs 60.

As illustrated in FIG. 5, the LEDs 60 can each be aligned with respective ones of the optical lens elements 70 such that the physical center P and the focal center F are coaxial. In another embodiment, the LEDs 60 can each be slightly offset with respective ones of the optical lens elements 70 such that the physical center P and the focal center F are non-coaxial. In one embodiment, the lens cover 64 can have a unitary one-piece construction formed of a polycarbonate material and/or polymethyl methacrylate (PMMA). It is to be appreciated, however, that the lens cover 64 can be formed of any of a variety of suitable alternative translucent or transparent materials that can protect underlying LEDs from environmental conditions and can also accommodate a plurality of optical lens elements 70 for redistributing light transmitted from underlying LEDs.

The lens cover 64 can be spaced from the submount 56 such that the lens cover 64 and the submount 56 cooperate to define an interior 72 therebetween. An encapsulating material 74 can be provided within the interior 72 such that the encapsulating material 74 substantially fills the interior 72 and encapsulates the LEDs 60 therein. The encapsulating material 74 can be formed of an optically neutral (or enhancing) material that reduces optical loss in the interior 72 that might otherwise occur without the encapsulating material 74 (e.g., if there was air in the interior 72). In one embodiment, the interior 72 can be filled with enough of the encapsulating material 74 (e.g., filled entirely) to cause the interior 72 to be substantially devoid of air bubbles or other media that would adversely affect the optical integrity between the LEDs 60 and the lens cover 64. The encapsulating material 74 can also protect the LEDs 60 from environmental conditions that might be able to bypass the lens cover 64 such as a gaseous fluid (e.g., greenhouse gas). In one embodiment, the encapsulating material 74 can be a silicone gel such as a methyl type silicone (e.g., polydimethylsiloxane) or a phenyl-type silicone, for example, that has a refractive index of between about 1.35 and 1.6. It is to be appreciated that any of a variety of suitable alternative materials are contemplated for the encapsulating material 74.

The encapsulating material 74 can be substantially softer than the lens cover 64 (e.g., the encapsulating material 74 can have a hardness that is less than a hardness of the lens cover 64). In one embodiment, the encapsulating material 74 can be a flowable material, such as a fluid or gel that can be injected or otherwise dispensed into the interior 72 after the lens cover 64 is assembled on the submount 56. In another embodiment, the encapsulating material 74 can be coated onto the lens cover 64 and/or over the submount 56 and LEDs 60 prior to assembling the lens cover 64 on the submount 56.

Still referring to FIG. 5, a protective coating 76 can be provided over an exterior surface 77 of the lens cover 64. The protective coating 76 can be hydrophobic, oleophobic, and/or chemically resistant such that the exterior surface of the lens cover 64 is protected from harmful environmental conditions that might otherwise adversely affect the optical performance of the optical lens elements 70. The protective coating 76 can additionally or alternatively optically enhance the transmission quality of the optical lens elements 70. In one embodiment, the protective coating 76 can be a thin-film inorganic material that protects against environmental conditions (e.g., chemical etching) and also improves overall transmission quality of the optical lens elements 70. The thin-film inorganic material can be between about 10 nm and about 200 nm thick and can have a refractive index above about 1.49. Some examples of suitable thin-film inorganic materials include $MgF_2$, $CaF_2$, $SiO_2$, $Al_2O_3$ and/or $TiO_2$. Although the protective coating 76 is shown to be a single layer arrangement, it is to be appreciated that the protective coating 76 can alternatively be a multi-layer arrangement that is either homogenous (multiple layers of the same material) or heterogeneous (multiple layers of different material).

It is to be appreciated that the light emitted by the first lighting module 24 can conform to a lighting profile (e.g., range of color, overall distribution of light, heat profile) that is defined by the physical configuration of the first lighting module 24 (e.g., the types of LEDs 60 that are utilized (e.g., single color or multi color), the physical layout of the LEDs 60, the optics provided by the lens elements (e.g., 68), the encapsulating material (e.g., 74), the protective coating (e.g., 76), and the overall power consumption). Although various examples of the physical configuration of the first lighting module are described above and shown in the figures, it is to be appreciated that any of a variety of suitable alternative physical configurations of the first lighting module 24 are contemplated for achieving a desired lighting profile.

Referring now to FIGS. 1 and 3, a heat sink 78 can be disposed over each of the first and second lighting modules 24, 26 and can be configured to dissipate heat away from the first and second lighting modules 24, 26. The heat sink 78 can be formed of any of a variety of a thermally conductive materials, such as aluminum or copper, for example. The heat sink 78 can be in contact with the submounts 56, 58 on an opposite side from the LEDs (e.g., 60). Heat generated by the LEDs (e.g., 60) can be transferred from the submounts 56, 58 to the heat sink 78 and dissipated to the surrounding environment by a plurality of fins 80. In one embodiment, a heat sink compound (not shown), such as thermal paste, for example, can be provided between the submounts 56, 58 and the heat sink 78 to enhance the thermal conductivity therebetween. Although the heat sink 78 is shown to be a unitary component that is provided over the first and second lighting modules 24, 26, it is to be appreciated that dedicated heat sinks can alternatively be provided for each of the first and second lighting modules 24, 26.

Referring now to FIG. 3, a controller 82 can be disposed in the controller receptacle 52 and can be configured to power and control the first and second lighting modules 24, 26. As illustrated in FIG. 1, the lid portion 54 of the cover member 44 can overlie the controller receptacle 52 and the controller 82. The lid portion 54 can serve as a heat sink for the controller 82 and can include a plurality of fins 84 to facilitate dissipation of heat from the controller 82. A heat sink compound (not shown), such as thermal paste, for example, can be provided between the lid portion 54 and the controller 82 to enhance the thermal conductivity therebetween. The main frame 42 and the cover member 44 can each be formed of a thermally conductive material such as aluminum, for example. Heat from the first and second lighting modules 24, 26 and the controller 82 can be transmitted throughout the housing 22 to effectively supplement the cooling properties of the heat sink 78 and the lid portion 54.

Referring now to FIGS. 1 and 2, the housing 22 can define a passageway 85 that extends between the light support portion 30 and the controller support portion 32 such that the first and second lighting modules 24, 26 and the controller 82 are physically spaced from each other. The passageway 85 can be configured to allow air to flow between the light support portion 30 and the controller support portion 32 to enhance cooling of the first and second lighting modules 24, 26 and the controller 82 during operation. In one embodiment, as illustrated in FIG. 3, the housing 22 can comprise a plurality of rib members 86 that extend between the light support portion 30 and the controller support portion 32 to provide structural rigidity therebetween.

Figure 6:
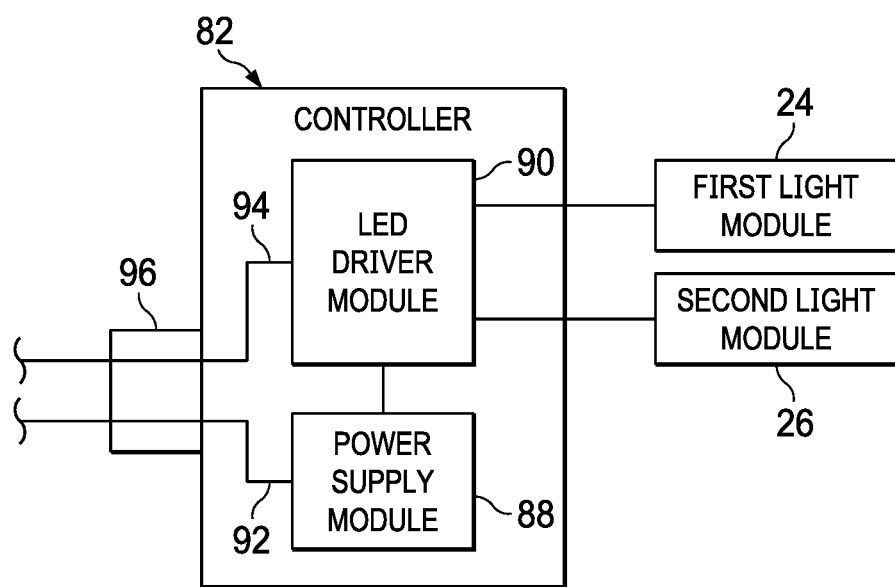
FIG. 6 is a schematic view of various components of the light fixture of FIG. 1.

Referring now to FIG. 6, the controller 82 can include a power supply module 88 and an LED driver module 90. The power supply module 88 can be coupled with the LED driver module 90, and the LED driver module 90 can be coupled with each of the first and second lighting modules 24, 26 (e.g., in parallel). The power supply module 88 can include a power input 92 that is coupled with a power source (not shown), such as an A/C power source, for delivering external power to the power supply module 88 for powering the first and second lighting modules 24, 26. The power supply module 88 can be configured to condition the external power from the power source (e.g., transform AC power to DC power) to facilitate powering of the LEDs (e.g., 60). In one embodiment, the light fixture 20 can be configured to operate at an input power of between about 85 VAC and about 347 VAC (e.g., a 750 Watt load capacity).

The LED driver module 90 can include a control input 94 that is coupled with a control source (not shown), such as a greenhouse controller, for example, that delivers a control signal to the LED driver module 90 for controlling the first and second lighting modules 24, 26, as will be described in further detail below. The LED driver module 90 can be configured to communicate according to any of a variety if suitable signal protocols, such as BACnet, ModBus, or RS485, for example.

The power input 92 and the control input 94 can be routed to a socket 96 (FIGS. 2 and 6) that is configured to interface with a plug (not shown) that can deliver the external power and control signals to the power supply module 88 and the LED driver module 90, respectively. In one embodiment, the socket 96 can be a Wieland-type connector, although other connector types are contemplated. It is to be appreciated that although the power and control signals are shown to be delivered through the socket 96 (e.g., via the same cable), the light fixture 20 can alternatively include separate ports for the power and the control signal such that the power and the control signal are transmitted to the power supply module 88 and the LED driver module 90 along different cables.

The LED driver module 90 can be configured to control one or more of the intensity, color, and spectrum of the light generated by the LEDs (e.g., 60) as a function of time (e.g., a light recipe). The LED driver module 90 can control the light recipe of the first and second lighting modules 24, 26 independently such that the first and second lighting modules 24, 26 define respective first and second lighting zones that are independently controllable within the lighting environment. The light recipes of the first and second lighting zones can accordingly be tailored to accommodate the lighting requirements of plants that are provided within the lighting environment. For example, when the plants provided in each of the first and second lighting zones are the same (or have similar lighting requirements), the respective light recipes for the first and second lighting modules 24, 26 can be the same to provide a substantially uniform lighting environment between the first and second lighting zones. When a group of plants provided in the first lighting zone has a different lighting requirement from a group of plants provided in the second lighting zone, the respective light recipes for the first and second lighting modules 24, 26 can be tailored to accommodate the different lighting requirements between the groups of plants. In one embodiment, the first and second lighting modules 24, 26 can have unique addresses such that the control signal can assign separate lighting recipes to each of the first and second lighting modules 24, 26 (via the LED driver module 90) based upon their unique addresses. It is to be appreciated, that although the LED driver module 90 is described as being configured to control the light recipe of each of the first and second lighting modules 24, 26, the LED driver module 90 can additionally or alternatively be configured to control any of a variety of suitable alternative variable lighting features of the first and second lighting modules 24, 26 (e.g., any lighting feature that can be controlled in real time with a control signal).

The first and second lighting modules 24, 26 can be self-contained, stand-alone units that are physically separate from each other. As such, the physical configuration and variable lighting features of each of the first and second lighting modules 24, 26 can be individually selected to allow the first and second lighting zones to be customized to achieve a desired lighting environment. In one embodiment, the first and second lighting modules 24, 26 can be exchanged with different lighting modules during the life cycle of a plant to optimize the lighting environment for the plant throughout its life cycle.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A light fixture for an indoor growing facility, the light fixture comprising:
   a housing comprising a first portion and a second portion, the second portion of the housing defining a window;
   a controller at least partially disposed within the first portion;
   a first lighting module at least partially disposed in the second portion;
   a second lighting module at least partially disposed in the second portion adjacent to the first lighting module, each of the first lighting module and the second lighting module comprising a submount and a plurality of light emitting diodes coupled with the submount and configured to project light through the window; and
   a unitary heat sink disposed over both of the first lighting module and the second lighting module, wherein:
   the first lighting module and the second lighting module are physically independent from each other;
   the first lighting module and the second lighting module are horizontally spaced from the controller; and the housing defines a passageway that extends vertically through the housing between the first portion and the second portion such that the passageway is interposed between the first lighting module and the controller.

2. The light fixture of claim 1 wherein the housing further comprises a plurality of rib members that extend between the first portion and the second portion and are at least partially disposed in the passageway.

3. The light fixture of claim 1 wherein the housing further comprises a main frame and a cover member that overlies the main frame and is coupled with the main frame.

4. The light fixture of claim 3 wherein:
the main frame comprises a bottom controller wall and a plurality of sidewalls that cooperate with the bottom controller wall to define a controller receptacle; and
the controller is disposed within the controller receptacle.

5. The light fixture of claim 4 wherein the cover member comprises a lid portion that overlies and covers the controller receptacle.

6. The light fixture of claim 5 wherein the lid portion comprises heat sink fins that facilitate dissipation of heat from the controller.

7. The light fixture of claim 3 wherein the main frame comprises a bottom lighting wall that defines the window.

8. The light fixture of claim 3 wherein the main frame and the cover member are formed of a thermally conductive material such that heat generated by the first lighting module, the second lighting module, and the controller is transmitted throughout the housing.

9. A light fixture for an indoor growing facility, the light fixture comprising:
a housing comprising a first portion and a second portion, the second portion of the housing defining a window;
a controller at least partially disposed within the first portion;
a first lighting module at least partially disposed in the second portion;
a second lighting module at least partially disposed in the second portion adjacent to the first lighting module, each of the first lighting module and the second lighting module comprising a submount and a plurality of light emitting diodes coupled with the submount and configured to project light through the window; and
a unitary heat sink disposed over both of the first lighting module and the second lighting module, wherein:
the first lighting module and the second lighting module are horizontally spaced from the controller;
the housing defines a passageway that extends vertically through the housing between the first portion and the second portion such that the passageway is interposed between the first lighting module and the controller;
and
the first lighting module and the second lighting module are physically independent from each other and are independently controllable by the controller.

10. The light fixture of claim 9 wherein the housing further comprises a plurality of rib members that extend between the first portion and the second portion and are at least partially disposed in the passageway.

11. The light fixture of claim 9 wherein the housing further comprises a main frame and a cover member that overlies the main frame and is coupled with the main frame.

12. The light fixture of claim 11 wherein:
the main frame comprises a bottom controller wall and a plurality of sidewalls that cooperate with the bottom controller wall to define a controller receptacle; and
the controller is disposed within the controller receptacle.

13. The light fixture of claim 12 wherein the cover member comprises a lid portion that overlies and covers the controller receptacle.

14. The light fixture of claim 13 wherein the lid portion comprises heat sink fins that facilitate dissipation of heat from the controller.

15. The light fixture of claim 11 wherein the main frame comprises a bottom lighting wall that defines the window.

16. The light fixture of claim 11 wherein the main frame and the cover member are formed of a thermally conductive material such that heat generated by the first lighting module, the second lighting module, and the controller is transmissible between the first portion and the second portion of the housing.

17. The light fixture of claim 9 wherein the controller is configured to control the first lighting module and the second lighting module to output different light recipes.

18. A light fixture for an indoor growing facility, the light fixture comprising:
a housing comprising a first portion and a second portion, the second portion of the housing defining a window;
a controller at least partially disposed within the first portion;
a first lighting module at least partially disposed in the second portion;
a second lighting module at least partially disposed in the second portion adjacent to the first lighting module, each of the first lighting module and the second lighting module comprising a submount and a plurality of light emitting diodes coupled with the submount and configured to project light through the window;
a unitary heat sink disposed over both of the first lighting module and the second lighting module, wherein:
the first lighting module and the second lighting module are physically independent from each other;
the first lighting module and the second lighting module are horizontally spaced from the controller;
the housing defines a passageway that extends vertically through the housing between the first portion and the second portion such that the passageway is interposed between the first lighting module and the controller;
and
the housing further comprises a main frame and a cover member that overlies the main frame and is coupled with the main frame.

19. The light fixture of claim 18 wherein:
the main frame comprises a bottom controller wall and a plurality of sidewalls that cooperate with the bottom controller wall to define a controller receptacle;
the cover member comprises a lid portion that overlies and covers the controller receptacle; and
the controller is disposed within the controller receptacle.

20. The light fixture of claim 19 wherein the lid portion comprises heat sink fins that facilitate dissipation of heat from the controller.

21. The light fixture of claim 20 wherein the main frame and the cover member are formed of a thermally conductive material such that heat generated by the first lighting module, the second lighting module, and the controller is transmissible between the first portion and the second portion of the housing.

\* \* \* \* \*